(No Model.)
C. H. BENNETT.
SAW FRAME.
No. 251,166. Patented Dec. 20, 1881.
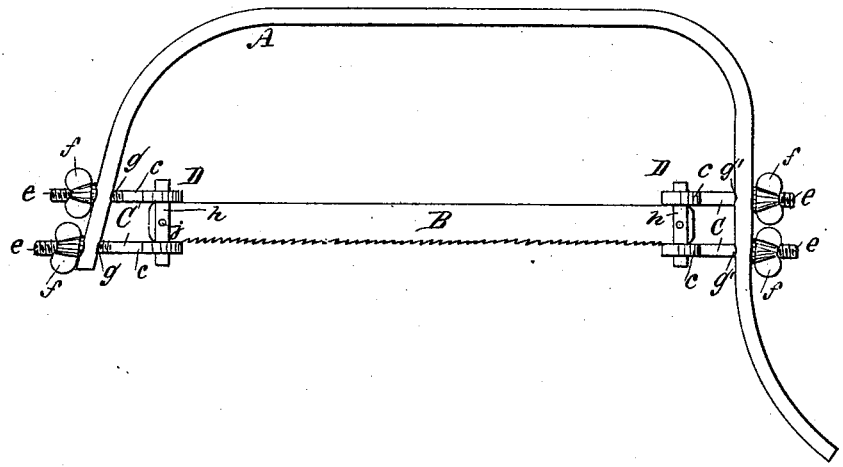
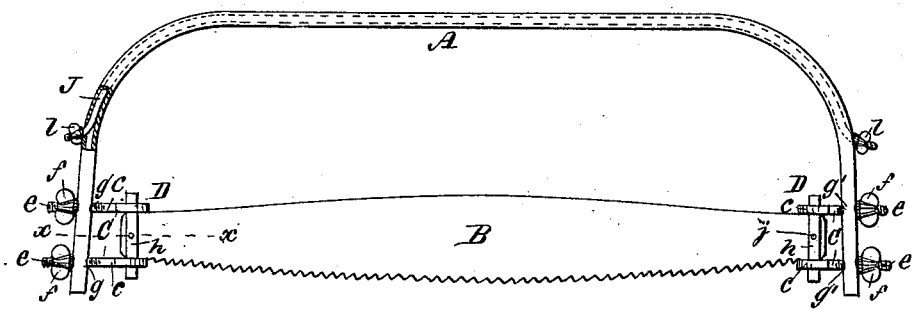
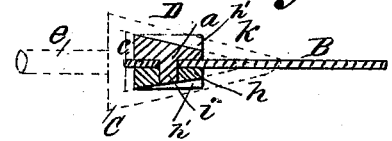
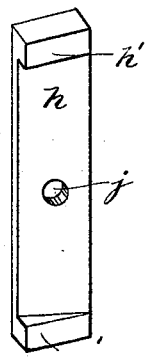
WITNESSES:
Theo. G. Hoster
C. Sedgwick
INVENTOR:
C. H. Bennett
BY Munn & Co
ATTORNEYS.

UNITED STATES PATENT OFFICE.

CHARLES H. BENNETT, OF BLOSSBURG, PENNSYLVANIA.

SAW-FRAME.

SPECIFICATION forming part of Letters Patent No. 251,166, dated December 20, 1881.

Application filed October 12, 1881. (No model.)

*To all whom it may concern:*

Be it known that I, CHARLES H. BENNETT, of Blossburg, in the county of Tioga and State of Pennsylvania, have invented a new and useful Improvement in Saw-Frames, of which the following is a full, clear, and exact description.

Reference is to be had to the accompanying drawings, forming part of this specification, in which similar letters of reference indicate corresponding parts in all the figures.

Figure 1 is a plan view of a bucksaw having my improved frame. Fig. 2 is a plan view of a crosscut-saw having my improved frame, parts of the frame being broken away. Fig. 3 is a plan view of one of the yoke-bolts or key-bolts. Fig. 4 is a perspective view of one of the clamp-plates, and Fig. 5 is a section taken on the line $x\ x$ of Fig. 2.

The invention consists in clamping and straining the saw-blade, as hereinafter described and claimed.

A represents the frame or bow of gas-pipe. B represents the saw-blade, and C represents the yoke or key bolts, and D represents the sets of clamps.

The yoke or key bolts C are formed with the triangular yokes $c$ and with the shanks $e$, which are adapted to pass through the holes $g$ $g'$, made through the bow or frame, and which are threaded to receive the thumb-nuts $f\ f$ outside of the bow, as shown. Each of the clamps $a$ of the sets D is formed with a stud, $i$, while the clamps $h$ of the sets are formed with the corresponding hole $j$, and both are provided with the offsets $h'\ h'$. Between the latter is the space to be occupied by the saw-blade.

The ends of the saw are provided with the holes $k\ k$, through which the studs $i$ pass, and these studs are of such length that they reach through the holes $k$, and also through the holes in the clamps $h$.

In putting the saw and frame together, after the clamps have been put in place upon the sides of the saw, the yokes of the key-bolts are to be placed over the ends of the clamps above and below the edges of the saw. The shanks of the bolts are then to be passed through the holes in the bow and the thumb-nuts screwed upon them. When the key-bolts are drawn tight by the nuts the triangular formation of the yokes will cause the clamps to close tightly upon the saw and hold the saw and frame securely together and cause the saw to be strained up in proper shape for use.

In order to make the frame of the crosscut-saw more rigid and firm, I provide the same with the truss-rod J, which passes through the upper bent portion of the pipe of the frame and protrudes at its ends through suitable holes in the pipe, as shown in the drawings, and the ends of the truss-rods are provided with the screw-nuts $l\ l$, by means of which the rod may be loosened or drawn tight, as required.

The outside faces of the clamps are made inclined, as shown in Figs. 4 and 5, to better fit the arms of the yoke of the key-bolts, and they have the offsets $h'\ h'$, as clearly shown in Fig. 4.

Having thus described my invention, I claim as new and desire to secure by Letters Patent—

In combination with the saw and frame, the externally-inclined clamps $a\ h$, of which one has an inside stud, $i$, passing through the other clamp and through the saw, and the triangular yokes on the inner ends of adjustable screws, as shown and described.

CHARLES HENRY BENNETT.

Witnesses:
  STEPHEN HENRY HOLLANDS,
  WILLIAM HENRY DANIELS.